US011669500B2

(12) United States Patent
Shin et al.

(10) Patent No.: US 11,669,500 B2
(45) Date of Patent: Jun. 6, 2023

(54) SYSTEM AND METHOD FOR DISTRIBUTING DATA USING BLOCK CHAIN

(71) Applicant: Markany Inc., Seoul (KR)

(72) Inventors: Dong Hwan Shin, Seoul (KR); Hong Gu Kim, Seoul (KR); Hong Joon Ha, Seoul (KR); Lae Wook Lee, Gyeonggi-do (KR); Hwa Min Yu, Seoul (KR); Jong Uk Choi, Seoul (KR)

(73) Assignee: Markany, Inc., Seoul (KR)

( * ) Notice: Subject to any disclaimer, the term of this patent is extended or adjusted under 35 U.S.C. 154(b) by 504 days.

(21) Appl. No.: 16/687,109

(22) Filed: Nov. 18, 2019

(65) Prior Publication Data

US 2021/0081374 A1 Mar. 18, 2021

(30) Foreign Application Priority Data

Sep. 16, 2019 (KR) .................. 10-2019-0113418

(51) Int. Cl.
*G06F 16/20* (2019.01)
*G06F 16/182* (2019.01)
*G06Q 20/06* (2012.01)
*H04L 9/06* (2006.01)

(52) U.S. Cl.
CPC ..... *G06F 16/1837* (2019.01); *G06Q 20/0658* (2013.01); *H04L 9/0637* (2013.01); *H04L 9/0643* (2013.01)

(58) Field of Classification Search
CPC .................. G06F 16/1837; G06Q 20/0658
See application file for complete search history.

(56) References Cited

U.S. PATENT DOCUMENTS

| 7,072,861 B1* | 7/2006 | Yamanaka .......... H04L 12/1439 |
| | | 705/17 |
| 10,459,990 B1* | 10/2019 | Li .................. G06F 16/901 |
| 2018/0227293 A1 | 8/2018 | Uhr et al. |
| 2019/0108513 A1* | 4/2019 | Kano .................. G06F 21/64 |
| 2019/0243986 A1 | 8/2019 | Uhr et al. |
| 2020/0110813 A1* | 4/2020 | Kamijoh ............ G06F 16/1805 |
| 2020/0211003 A1* | 7/2020 | Fletcher ............. H04L 63/1441 |
| 2020/0234386 A1* | 7/2020 | Blackman ................ H04L 9/14 |
| 2020/0301944 A1* | 9/2020 | Lee .................... G06F 16/9027 |
| 2020/0322132 A1* | 10/2020 | Covaci ................ H04L 9/3247 |

(Continued)

FOREIGN PATENT DOCUMENTS

| KR | 1016619330000 B1 | 10/2016 |
| KR | 1020190059491 A | 5/2019 |
| KR | 1020190095067 A | 8/2019 |

OTHER PUBLICATIONS

Korean Notice of Grounds for Rejection dated Nov. 11, 2019 for Korean Patent Application No. 10-2019-0113418.

(Continued)

*Primary Examiner* — Tarek Chbouki
(74) *Attorney, Agent, or Firm* — Snell & Wilmer L.L.P.

(57) ABSTRACT

A system and method for distributing data are provided. The system for distributing data which manages the distribution of data from one or more data transmitting nodes to a data receiving node, according to one embodiment of the present invention, comprises: an off-chain pool management unit; an integrity authentication unit; a data distribution verification unit; and a block chain storage unit.

6 Claims, 4 Drawing Sheets

(56) References Cited

U.S. PATENT DOCUMENTS

2020/0344042 A1* 10/2020 Hwang ................ H04L 9/3239
2022/0038264 A1* 2/2022 Yakira ................. H04L 9/3026

OTHER PUBLICATIONS

Notice of Final Rejection for Korean Patent Application No. 10-2019-0113418 dated Mar. 6, 2020; 4pp.
Notice of Final Rejection for Korean Patent Application No. 10-2019-0113418 dated Jun. 5, 2020; 4pp.

* cited by examiner

SYSTEM AND METHOD FOR DISTRIBUTING DATA USING BLOCK CHAIN

STATEMENT REGARDING GOVERNMENT SPONSORED RESEARCH

This work was supported by Institute of Information & communications Technology Planning & Evaluation (IITP) grant funded by the Korea government (MSIT) [2018-0-00365, Development of on-off hybrid blockchain technology for real-time large-scale data distribution].

CROSS-REFERENCE TO RELATED APPLICATIONS

This application claims priority to Korean Patent Application No. 10-2019-0113418 filed Sep. 16, 2019 titled SYSTEM AND METHOD FOR DISTRIBUTING DATA USING BLOCK CHAIN, the disclosures of which are hereby incorporated by reference in their entirety.

TECHNICAL FIELD

The present invention relates to a system and method for distributing data using a block chain.

BACKGROUND

The conventional block chain technology is not capable of real-time exchange and control of large capacity data due to the limitation of block size. Generally, the block size of a block chain is 1 MB~4 MB, so large capacity data cannot be stored in the block chain. Particularly, in the case of bitcoin, the maximum size of one block is 1 MB, and since a block is generated every 10 minutes, its maximum transmission rate is just about 7 TPS (Transaction Per Second). Ethereum has been known to have the transmission rate of 15 TPS.

On the other hand, when transmitting large capacity data, there is a case where a P2P (Peer To Peer) file system is used. A person who holds a file in the P2P file system is called Seeder; as many seeders turn on their own computers, the download rate of the file gets faster. However, there is a problem that if the seeders turn off their computers so that they do not perform their roles, the download rate of the file gets slower.

SUMMARY

The object of the present invention is to solve the aforementioned problems when using a block chain and the P2P file system for distributing data.

A system for distributing data which manages the distribution of data from one or more data transmitting nodes to a data receiving node, according to one embodiment of the present invention in order to achieve the aforementioned technical subject matters, comprises: an off-chain pool management unit for transmitting an identification number of an off-chain pool to the data receiving node upon receiving a request to create the off-chain pool from the data receiving node; an integrity authentication unit for, as for the data that the data receiving node receives from the data transmitting node through the off-chain pool or for the reception record that the data receiving node receives the data, authenticating the integrity of the data or authenticating the integrity of a reception record by deriving a Merkle Tree Root Hash Value using Merkle Tree; a data distribution verification unit for receiving a transmission record on transmitting the data from the one or more data transmitting node, and comparing the reception record with the transmission record to verify whether there is an error in the distribution of the data; and a block chain storage unit for storing the Merkle Tree Root Hash Value in the block chain, if it is verified at the data distribution verification unit that there is no error in the distribution of the data.

The system for distributing data may further comprise a billing unit for, when the off-chain pool management unit receives the request to create the off-chain pool from the data receiving node, receiving a predetermined cost from the data receiving node, receiving, from the data receiving node, a reception completion message indicating that the reception of the data has been completed, and then paying a transmission cost to the one or more data transmitting node.

The system for distributing data may further comprise a billing unit for, when the off-chain pool management unit receives the request to create the off-chain pool from the data receiving node, receiving a predetermined cost from the data receiving node, receiving, from the data transmitting node, a transmission completion message indicating that the transmission of the data has been completed, and then paying a transmission cost to the one or more data transmitting node.

The transmission record is based on a transmission receipt that is issued to the data transmitting node as the data receiving node receives the data from the data transmitting node, and wherein the transmission receipt is executed with digital signature using a private key of the data receiving node.

If it is verified at the data distribution verification unit that there is no error in the distribution of the data, the block chain storage unit further stores meta-information or transaction record of the data in the block chain, wherein the meta-information contains at least one of name of the data, maker of the data and production year of the data, and wherein the transaction record is distribution record of the data created based on the transmission record or the reception record.

A method for distributing data which manages the distribution of data from one or more data transmitting nodes to a data receiving node, according to one embodiment of the present invention, comprises: an off-chain pool management step of transmitting an identification number of an off-chain pool to the data receiving node upon receiving a request to create the off-chain pool from the data receiving node; an integrity authentication step of, as for the data that the data receiving node receives from the data transmitting node through the off-chain pool or for the reception record that the data receiving node receives the data, authenticating the integrity of the data or authenticating the integrity of the reception record by deriving a Merkle Tree Root Hash Value using Merkle Tree; a data distribution verification unit step of receiving a transmission record on transmitting the data from the one or more data transmitting node, and comparing the reception record with the transmission record to verify whether there is an error in the distribution of the data; and a block chain storage step of storing the Merkle Tree Root Hash Value in the block chain, if it is verified at the data distribution verification step that there is no error in the distribution of the data.

The method for distributing data may further comprise when receiving, at the off-chain pool management step, the request to create the off-chain pool from the data receiving node, receiving a predetermined cost from the data receiving node, and wherein the method for distributing further comprises paying a transmission cost to the one or more data transmitting node after receiving, from the data receiving node, a reception completion message indicating that the reception of the data has been completed.

The method for distributing data may further comprise when receiving, at the off-chain pool management step, the request to create the off-chain pool from the data receiving node, receiving a predetermined cost from the data receiving node, and wherein the method for distributing further comprises paying a transmission cost to the one or more data transmitting node, after receiving, from the data transmitting node, a transmission completion message indicating that the transmission of the data has been completed.

The transmission record is based on a transmission receipt that is issued to the data transmitting node as the data receiving node receives the data from the data transmitting node, and wherein the transmission receipt is executed with digital signature using a private key of the data receiving node.

If it is verified at the data distribution verification step that there is no error in the distribution of the data, the block chain storage step further comprises storing meta-information or transaction record of the data in the block chain, wherein the meta-information contains at least one of name of the data, maker of the data and production year of the data, and wherein the transaction record is distribution record of the data created based on the transmission record or the reception record.

A computer readable storage medium recording a program according to another embodiment of the present invention may perform the method for distributing data.

According to the aforementioned present invention, it is possible to distribute large capacity data while overcoming the limitations of the block size and the transmission rate of the block chain. Moreover, in the P2P file system, the present invention provides a motive to keep seeders in an active state, which enables a smooth distribution of data files.

DETAILED DESCRIPTION

Hereinafter, preferred embodiments of the present invention will be explained in detail with reference to the drawings attached herewith. The advantages and characteristics of the present invention, and the methods for achieving them would be clarified with reference to the embodiments to be explained below in detail, together with the drawings attached herewith. However, the present invention is not limited to the embodiments disclosed below and can be implemented in any other various forms, and these embodiments are provided just to complete the disclosure of the present invention and provide a person having ordinary skill in the art to which the present invention pertains with the scope of the invention completely, and the present invention is defined by the scope of the claims. The same reference numerals refer to the same elements throughout the entire specification.

Unless otherwise defined, all terms (including technical and scientific terms) used in the present specification can be used with the meaning that a person having ordinary skill in the technical field to which the present invention pertains can commonly understand. In addition, the terms defined in the generally used dictionary will not be ideally or excessively interpreted unless particularly defined.

The terms used in the present specification are just to explain the embodiments, and are not intended to limit to the present invention. In the present specification, singular terms include plural terms unless particularly mentioned. The term "comprise" and/or "which comprise" used in the present specification do(es) not exclude the presence or addition of one or more elements other than the elements mentioned.

Unless otherwise mentioned in the present specification, the term "in contact with" or "connected" may include that one element/feature is directly in contact with or connected with other element/feature or that one element/feature is indirectly in contact with or connected by interposing other element/feature. Thus, various diagrams illustrated in the drawings illustrate exemplary arrangements of elements and components, but there may be additional mediation elements, devices, features or components (when assumed that the functions of the elements illustrated are not adversely affected) in the actual embodiments.

In addition, in the present specification, "transmitting" or "receiving" may not only include directly transmitting or receiving information between a transmitter and a receiver, but also include transmitting or receiving information by interposing other object, unless otherwise mentioned.

Further, unless otherwise mentioned in the present specification, the expressions "first," "second" and "third" are used just to distinguish the objects that the terms refer to for the explanation of the invention. In addition, even if the objects are referred to using "first," "second," etc., the contents of the objects they refer to may be the same depending on cases.

Hereinafter, the system and method for distributing data according to the embodiments of the present invention will be explained with reference to the drawings.

Figure 1:
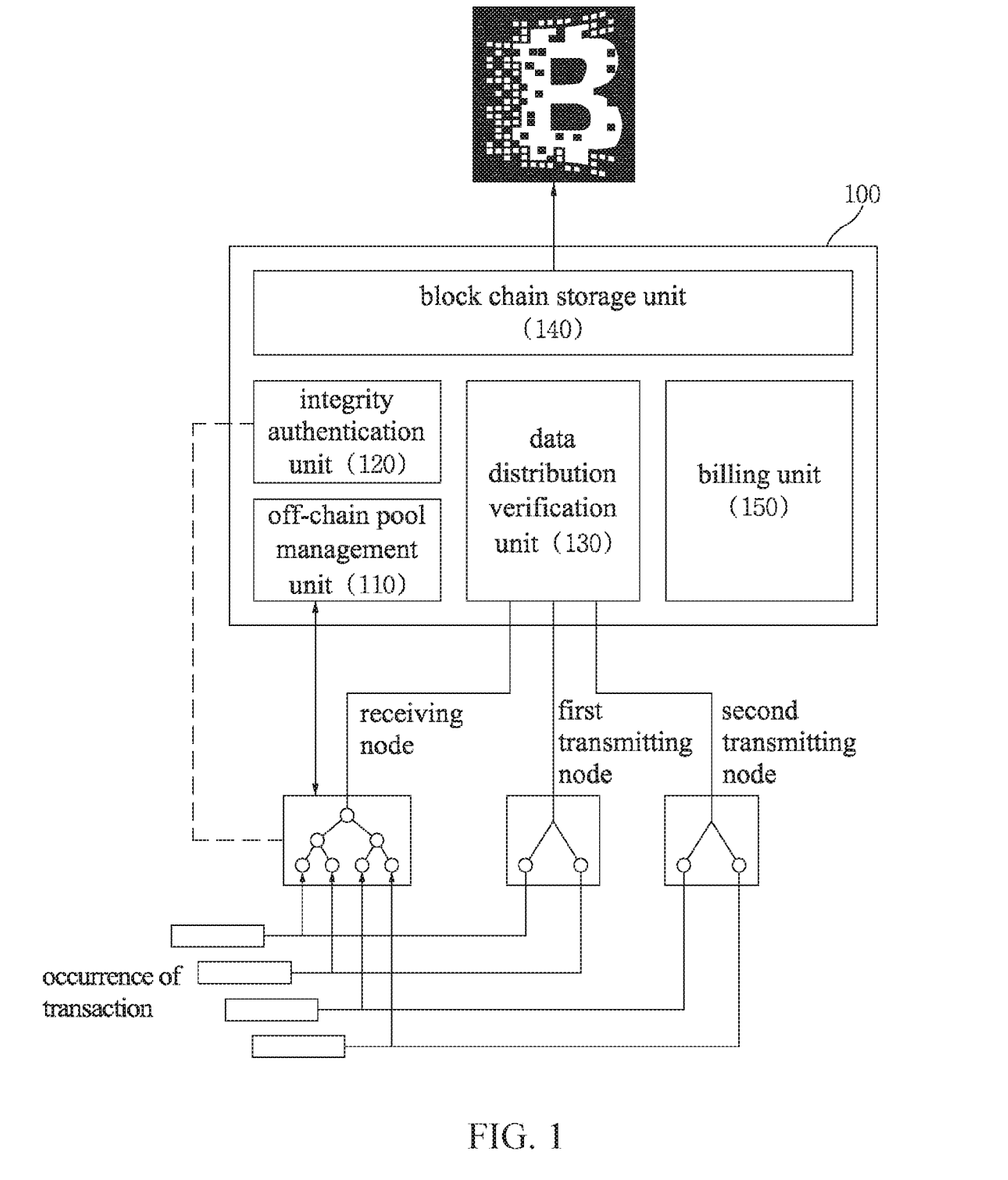
FIG. 1 is a view showing one embodiment of the system for distributing data.

FIG. 1 illustrates a system for distributing data according to one embodiment of the present invention. Specifically, the system (100) for distributing data, which manages the distribution of data from one or more data transmitting nodes to a data receiving node, comprises: an off-chain pool management unit (110) for transmitting an identification number of an off-chain pool to the data receiving node upon receiving a request to create the off-chain pool from the data receiving node; an integrity authentication unit (120) for, as for the data that the data receiving node receives from the data transmitting node through the off-chain pool or for the reception record that the data receiving node receives the data, authenticating the integrity of the data or authenticating the integrity of a reception record by deriving a Merkle Tree Root Hash Value using Merkle Tree; a data distribution verification unit (130) for receiving a transmission record on transmitting the data from the one or more data transmitting node, and comparing the reception record with the transmission record to verify whether there is an error in the distribution of the data; and a block chain storage unit (140) for storing the Merkle Tree Root Hash Value in the block chain, if it is verified at the data distribution verification unit that there is no error in the distribution of the data.

Referring to FIG. 1, the system (100) for distributing data according to one embodiment of the present invention may be connected to the block chain. In the present invention, the block chain may be a public block chain, a private block chain, a consortium block chain, etc. The block chain according to one embodiment of the present invention may have the properties explained below, but is not limited thereto, and any known block chain can be used.

In one embodiment, the respective blocks configuring the block chain of the present invention are connected to each other in the form of a Hash Chain. In other words, nth block stores a hash value of n-lth block. Thus, a change of information of any one block results in a change of a Hash Value of the block that has been calculated from the block, and this results in a change of the contents of the next block, which essentially causes a change of information of all blocks after the block. Here, the Hash Value can be calculated by a hash function which converts data having a certain data into data having a predetermined size.

In the present invention, the block chain can be implemented with any known block chain network other than those explained above, and this may be an external network different from the system (100) for distributing data, and may be implemented in such a manner that it shares at least part of nodes and devices with the system (100) for distributing data, as needed.

In the present invention, the data transmitting node may refer to a person, device, computer, sever, etc. that transmits data, and the data receiving node may refer to a person, device, computer, sever, etc. that receives data. In the case of transmitting and receiving the data using the P2P file system, the data transmitting system and the data receiving node may refer to a peer, and particularly, the data transmitting node may refer to a seeder that holds the data in its entirety.

In one embodiment, the P2P file system which is used to transmit and receive the data may be IPFS (Inter-Planetary File System). In addition, the P2P file system may be a system constructed only for the system (100) for distributing data or may be a system that is managed and maintained by an external entity. Further, the P2P file system may be implemented in such a manner that the system shares at least a part of nodes and devices with the system (100) for distributing data and the block chain. However, the P2P file system is not limited thereto, and may be a file system based on any known P2P methods as needed.

The off-chain pool management unit (110) transmits an identification number of an off-chain pool to the data receiving node upon receiving a request to create the off-chain pool from the data receiving node. Herein, the off-chain pool refers to a data channel through which data is distributed between the data transmitting node and the data receiving node. The identification number refers to, for example, ID of the off-chain pool which makes it possible to identify the off-chain pool, and the identification number may be numbers, alphabets, symbols, letters, figures, sounds, etc. or combinations thereof, and this is not limited to numbers only.

In addition, the off-chain pool management unit (110) may transmit an identification number of the off-chain pool to the data receiving node immediately after receiving a request to create the off-chain pool from the data receiving node, or may transmit it after a predetermine time has passed.

Moreover, the off-chain pool management unit (110) may autonomously provide an identification number of the off-chain pool to the data receiving node after receiving the request to create the off-chain pool from the data receiving node. Specifically, the off-chain pool management unit (110) may transmit a pre-created identification number to the data receiving node or may create an identification number when receiving the request to create the off-chain pool from the data receiving node and then transmit it. Herein, the identification number may be based on information of the request to create the off-chain pool. Specifically, the identification number may be created based on the time of the request to create, who has requested it to whom, etc.

Further, the off-chain pool management unit (110) may act as an intermediary between the data receiving node and the block chain, not autonomously providing an identification number of the off-chain pool to the data receiving node. Specifically, when the off-chain pool management unit (110) transmits the request to create the off-chain pool received from the data receiving node to the block chain, the block chain may transmit the identification number to the off-chain pool management unit (110), and the off-chain pool management unit (110) may transmit the received identification number to the data receiving node. As such, even in case where the identification number is provided from the block chain, the identification number may be based on information of the request to create the off-chain pool, or a pre-created identification number can be immediately used.

In the present invention, the phrase 'the off-chain pool management unit (110) transmits identification number of an off-chain pool to the data receiving node upon receiving a request to create the off-chain pool from the data receiving node' includes not only that the off-chain pool management unit (110) autonomously provides an identification number, but also that the off-chain pool management unit acts as an intermediary between the data receiving node and the block chain.

As for the data that the data receiving node receives from the data transmitting node through the off-chain pool, the integrity authentication unit (120) may authenticate the integrity of the data by deriving a Merkle Tree Root Hash Value using Merkle Tree. Or, as for the reception record that the data receiving node receives the data, the integrity authentication unit (120) may authenticate the integrity of the reception record by deriving a Merkle Tree Root Hash Value using Merkle Tree.

The reception record refers to a record showing that the data receiving node has received data from the data transmitting node, and the reception record may include information of the data transmitting node (e.g., IP, name, production company, etc. of the transmitting node), information of the data receiving node (e.g., IP, name, production company, etc. of the receiving node), data reception time, data size, number of data, content of data, etc.

Merkle Tree is the technology used for simple and secure authentication of data in this technical field. Specifically, referring to FIG. 1, a transaction occurs between one or more transmitting node and a receiving node. Herein, out of initial data that the receiving node receives from the one or more transmitting nodes, two adjacent data are combined as a pair and then converted into a hash value. The data is continuously converted into hash values in such manner, and this process is repeated until only one remains; here, the last remaining one hash value is the Merkle Tree Root Hash Value.

Figure 4:
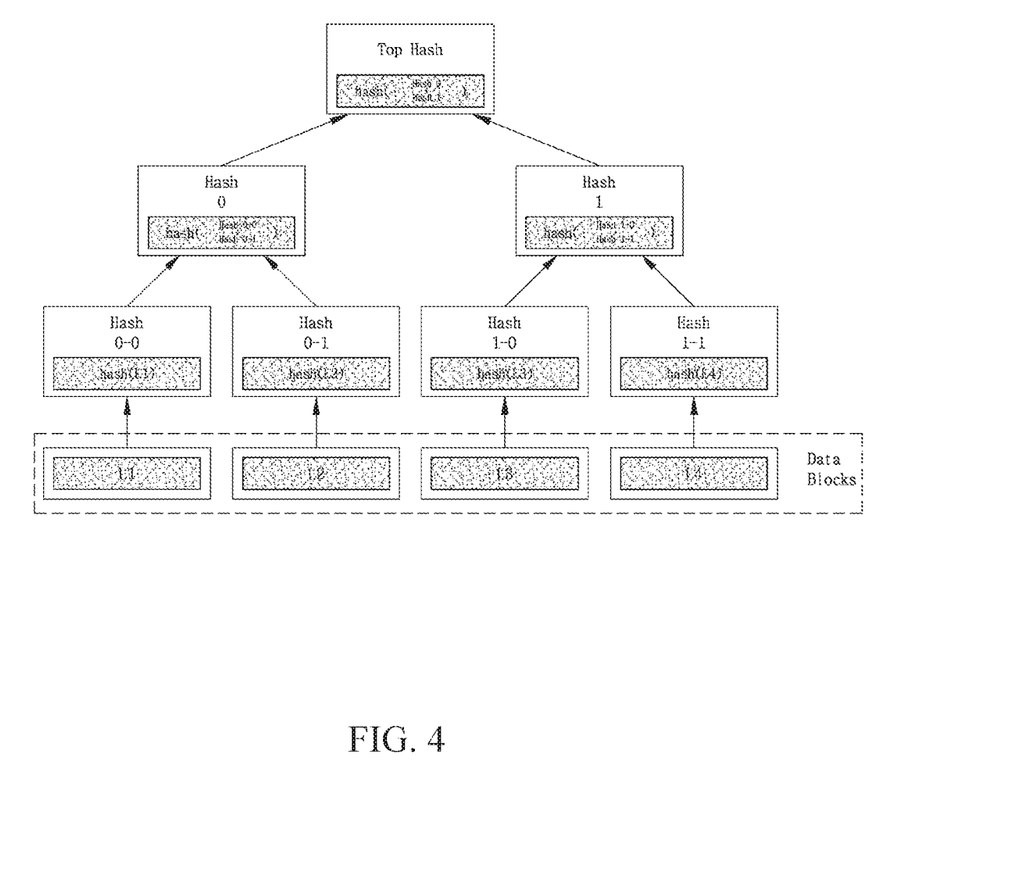
FIG. 4 is a view showing an operation structure of the Merkle Tree.

More specifically, the operation structure of Merkle Tree (called Hash Tree in the cryptology field) will be explained with reference to FIG. 4. Merkle Tree has an advantage that when some data is damaged, it makes it easy to figure out which data is damaged so that only the damaged data can be fast received again. Due to this advantage, Merkle Tree is usually used to fast verify the integrity of data received through a P2P network. Typically, this has been also used in BitTorrent.

In the present invention, Merkle Tree can be used in order to identify that data to be transmitted has not been changed, but can also be used for the purpose of verifying the collection of receipts (i.e. the reception records) of micro transactions, and its resulting values, i.e. Merkle Tree Root Hash Values can be stored in the block chain. Specifically, in FIG. 4, leafs (L1, L2, L3, L4) may each refer to the reception record. The characteristic of this Merkle Tree lies in obtaining a means for verifying the whole reception records if only the Merkle Tree Root Hash Value (Top Hash) of the reception record is identified. The Merkle Tree Root Hash Value is recorded in the block chain, and when a problem occurs in settling the remaining costs for the transmission of the transmitting nodes, it can be fast identified which reception record has a problem by extracting a Merkle Tree Root Hash Value again using the entire reception records and comparing it with the Hash Value recorded in the block chain.

As such, as for data created in transactions between the data receiving node and one or more transmitting node or reception records, their integrity can be authenticated by deriving a Merkle Tree Root Hash Value for. Herein, the integrity of the data or reception records means that there is no loss and no unconformity in the data or reception records.

The integrity authentication unit (120), after receiving data from the receiving node, may derive a Merkle Tree Root Hash Value using Merkle Tree for the received data, or the integrity authentication unit (120) may access the receiving node to derive the Merkle Tree Root Hash Value for data stored in the receiving node and then allow the system (100) for distributing data to receive the Merkle Tree Root Hash Value.

Likewise, the integrity authentication unit (120), after receiving the reception record from the receiving node, may derive the Merkle Tree Root Hash Value using Merkle Tree for the reception record, or the integrity authentication unit (120) may access the receiving node to derive the Merkle Tree Root Hash Value for the reception record stored in the receiving node and then allow the system (100) for distributing data to receive the Merkle Tree Root Hash Value.

According to one embodiment, the integrity authentication unit (120) may also authenticate integrity using Merkle Tree for the reception record that the data transmitting node transmits the data to the data receiving node. Even then, the integrity authentication unit (120) may derive the Merkle Tree Root Hash Value using Merkle Tree for the received, transmission record after receiving the transmission record from the transmitting node, or the integrity authentication unit (120) may access the transmitting node to derive the Merkle Tree Root Hash Value for the transmission record stored in the transmitting node and then allow the system (100) for distributing data to receive the Merkle Tree Root Hash Value.

The data distribution verification unit (130) receives a transmission record on transmitting the data from the one or more data transmitting node, and compares the reception record with the transmission record to verify whether there is an error in the distribution of the data. Here, the data distribution verification unit (130) may directly receive the reception record from the data receiving node or may receive through the integrity authentication unit (120). In addition, the data distribution verification unit (130) may directly receive the transmission record from the transmitting node or may receive it through the integrity authentication unit (120).

The transmission record on transmitting the data may include information of the data transmitting node, information of the data receiving node, data transmission time, data size, number of data, content of data, etc.

Figure 2:
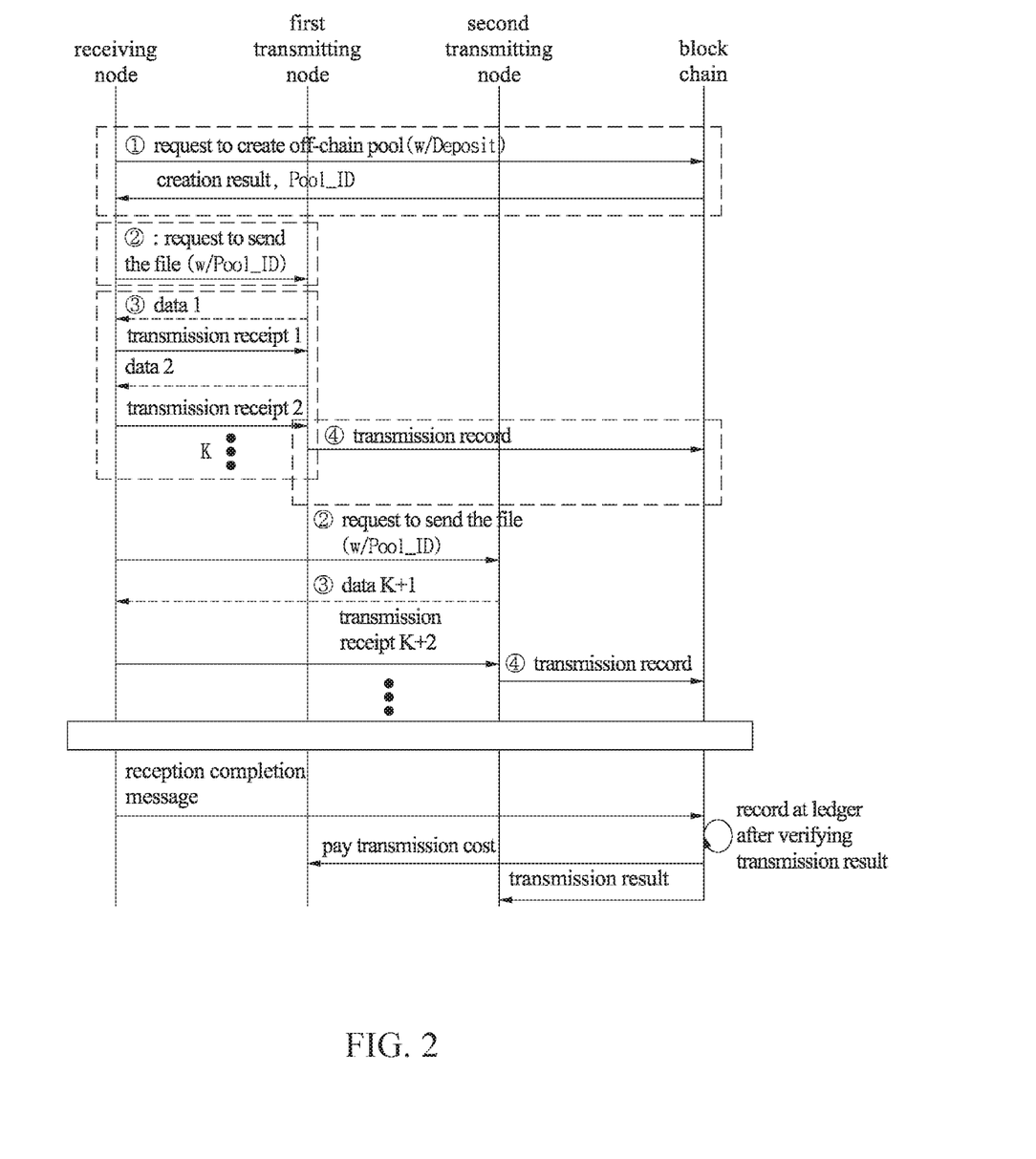
FIG. 2 is a view showing one embodiment of the method for distributing data.

According to one embodiment, as shown in FIG. 2, the data receiving node may issue a transmission receipt to the data transmitting node, after receiving data from the data transmitting node. Herein, the transmission receipt indicates that the data receiving node has received the data, and may include information such as information of the data transmitting node, information of the data receiving node, data reception time, data size, number of data, content of data, etc. In addition, the transmission receipt may be executed with digital signature using a private key of the data receiving node, and the data transmitting node may verify the authenticity of the transmission receipt using a public key of the data receiving node.

According to one embodiment, the transmission record that the data transmitting node transmits to the data distribution verification unit (130) may be based on the transmission receipt. Specifically, the transmission record may be configured using the information (for example, information of the data transmitting node, information of the data receiving node, data reception time, data size, number of data, contents of data, etc.) described in the transmission receipt.

The data distribution verification unit (130) verifies whether there is an error in the distribution of the data, by determining whether the transmission record on transmitting the data corresponds to the reception record on receiving the data. For example, if, as shown in FIG. 1, the receiving node receives two data from a first transmitting node and receives two data from a second transmitting node, the data distribution verification unit (130) receives, from the first transmitting node, the transmission record that 'the first transmitting node has transmitted two data to the receiving node,' and receives, from the second transmitting node, the transmission record that 'the second transmitting node has transmitted two data to the receiving node,' and receives, from the receiving node, the reception record that 'the receiving node has received two data transmitted from the first transmitting node and received two data transmitted from the second transmitting node.' Then, the data distribution verification unit (130) can verify whether there is an error in the distribution of the data, by determining whether the transmission record and the reception record correspond to each other. Herein, that there is an error in the distribution of the data means that information on the number of data, contents of data, size of data, etc. described in the transmission record and the reception record do not correspond to each other.

Figure 3:
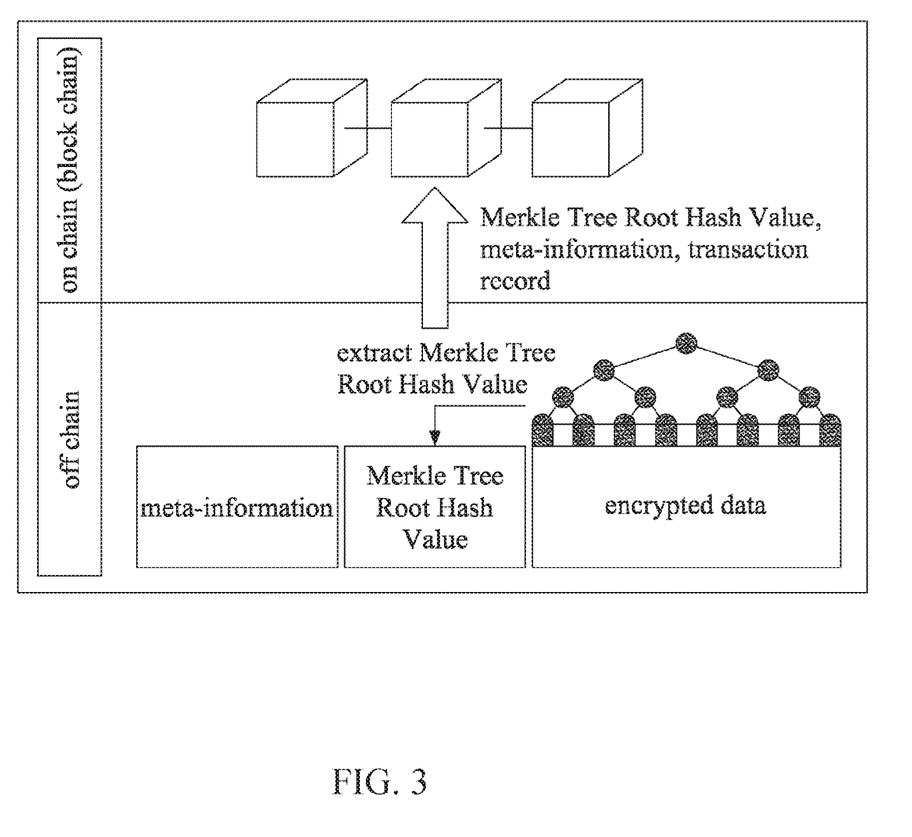
FIG. 3 is a view showing that the Merkle Tree Root Hash Value and meta-information of the data are stored in a block chain.

The block chain storage unit (140) stores the Merkle Tree Root Hash Value in the block chain, if it is verified at the data distribution verification unit (130) that there is no error in the distribution of the data. According to one embodiment, as shown in FIG. 3, the block chain storage unit (140) may further store meta-information or transaction record of the data in the block chain, if it is verified at the data distribution verification unit (130) that there is no error in the distribution of the data. Herein, the meta-information may contain at least one of name of the data, creator of the data and production year of the data. In addition, the transaction record may be created based on the transmission record received from the data transmitting node or the reception record received from the data receiving node. According to one embodiment, the transaction record may be configured by collecting the contents contained in the transmission record or the reception record (for example, information of the data transmitting node, information of the data receiving node, data transmission/reception time, data size, number of data, content of data, etc.).

According to one embodiment, the system (100) for distributing data may further comprise a billing unit (150). Referring to FIG. 2, when the off-chain pool management unit (110) receives a request to create a off-chain pool from the data receiving node, the billing unit (150) may receive a predetermined cost from the data receiving node. In addition, the billing unit (150) may pay a transmission cost to the data transmitting node that transmitted the data, after receiving, from the data receiving node, a reception completion message indicating that the reception of the data has been completed. Or, the billing unit (150) may pay a transmission cost to the data transmitting node that transmitted data, after receiving, from the data transmitting node, a transmission completion message indicating that the transmission of the data has been completed. Herein, the transmission cost may be at least part of the predetermined cost paid when the data receiving node sends the request to create the off-chain pool. As such, the data transmitting node gets paid for the data transmission, which allows the data transmitting node to play a role as a seeder (i.e., allows the computer to remain on), thereby making the distribution of data smooth.

According to one embodiment, the billing unit (150) may pay a transmission cost to the data transmitting node that transmitted data, after receiving both the transmission completion message from the data transmitting node and the reception completion message from the data receiving node. If the billing unit (150) depends only on the transmission completion message, there is a risk that the data transmitting node that is the party who receives the transmission cost sends a false report, whereas if the billing unit (150) depends only on the reception completion message, there is a risk that the data receiving node that is the party who pays the transmission cost sends a false report. Thus, these problems can be solved by paying the transmission cost after receiving both of the transmission completion message and the reception completion message.

According to one embodiment, even after receiving the transmission competition message, the reception completion message or both messages, the billing unit (150) may determine whether the data distribution verification has been completed and then pay the transmission cost to the data transmitting node. Specifically, if the time when the message (the transmission competition message, the reception completion message or both messages) is received is prior to the time when the verification has been completed at the data distribution verification unit (130), the transmission cost can be paid after the verification has been completed. On the other hand, if the time when the message is received is after the verification has been completed, the transmission cost can be paid immediately after the message is received.

The billing unit (15) may autonomously perform settlements (i.e., receiving a predetermined cost from the data receiving node and paying a transmission cost to the data transmission node), and may act as an intermediary between the data transmitting node, the data receiving node and the block chain. Specifically, the billing unit (15) may autonomously store a predetermined cost received from the data receiving node and directly pay to the data transmitting node, or may transmit a predetermined cost received from the data receiving node to the block chain and then transfer a transmission cost received from the block chain to the data transmitting node. In the present invention, the phrase 'the billing unit receives a predetermined cost from the data receiving node and pays a transmission cost to the data transmitting node' includes both of autonomously performing settlements and acting as an intermediary with respect to the block chain, as described above.

The method for distributing data according to one embodiment of the present invention comprises: an off-chain pool management step of transmitting an identification number of an off-chain pool to the data receiving node upon receiving a request to create the off-chain pool from the data receiving node; an integrity authentication step of, as for the data that the data receiving node receives from the data transmitting node through the off-chain pool or for the reception record that the data receiving node receives the data, authenticating the integrity of the data or authenticating the integrity of the reception record by deriving a Merkle Tree Root Hash Value using Merkle Tree; a data distribution verification unit step of receiving a transmission record on transmitting the data from the one or more data transmitting node, and comparing the reception record with the transmission record to verify whether there is an error in the distribution of the data; and a block chain storage step of storing the Merkle Tree Root Hash Value in the block chain, if it is verified at the data distribution verification step that there is no error in the distribution of the data.

Referring to FIG. 2, at the off-chain pool management step, when receiving the request to create the off-chain pool from the data receiving node, a predetermined cost can be received from the data receiving node.

In addition, referring to FIG. 2, the method for distributing data may further comprise a billing step of paying a transmission cost to the one or more data transmitting node, after receiving, from the data receiving node, a reception completion message indicating that the reception of the data has been completed. Or, at the billing step, a transmission cost can be paid after receiving a transmission completion message, not the reception completion message, or the transmission cost can be paid after receiving both the reception completion message and the transmission completion message.

The billing step can be performed any time after receiving the message (the transmission competition message, the reception completion message or both messages), and there is no limitation to the order. However, according to one embodiment, the billing step can be performed after the time when the message is received or the data distribution verification step, whichever is later. In addition, according to one embodiment, the billing step can be performed after the time when the message is received or the block chain storage step, whichever is later.

The methods for distributing data can be performed at a computer readable storage medium recording a program therein.

The computer readable storage medium may be any available medium that can be accessed by general or special-purpose computers. As unlimited examples, the computer readable storage media can be used to store RAM, ROM, EEPROM, CD-ROM or other optical disc storage, magnetic disc storage or other magnetic storage devices, or desired program code means in the form of instructions or data structures, and may include any other media that can be accessed by general or special-purpose computers. Disks and discs, when used in the present application, include compact disks (CD), laser disks, optical disks, digital multifunction disks (DVD), floppy discs and Blu-ray disks, and disks generally reproduce data magnetically but discs reproduce data optically with laser. The aforementioned combinations should also be included in the scope of the computer readable storage media.

The embodiments of the present invention have been explained with reference to the drawings attached herewith, and a person having ordinary skill in the art to which the present invention pertains may understand that the present invention can be carried out in any other specific forms, without changing the technical idea or essential features. Therefore, please note that the embodiments described above are just exemplary and are not limited thereto.

DESCRIPTION OF REFERENCE NUMERALS

100: system for distributing data
110: off-chain pool management unit
120: integrity authentication unit
130: data distribution verification unit
140: block chain storage unit
150: billing unit

What is claimed is:

1. A non-transitory computer readable storage medium for distributing data which manages the distribution of data from one or more data transmitting nodes to a data receiving node, configured to:
   transmit an identification number of an off-chain pool, by an off-chain pool management unit, to the data receiving node upon receiving a request to create the off-chain pool from the data receiving node;
   derive, by an integrity authentication unit, a Merkle Tree Root Hash Value using Merkle Tree: (a) authenticate the integrity of the data that the data receiving node receives from the data transmitting node through the off-chain pool, or (b) for a reception record that the data receiving node received the data, authenticating the integrity of the reception record;
   receive, by a data distribution verification unit a transmission record upon transmitting the data from the one or more data transmitting nodes, and comparing the reception record with the transmission record to verify whether there is an error in the distribution of the data;
   store, by a block chain storage unit, the Merkle Tree Root Hash Value in the block chain, if it is verified at the data distribution verification unit that there is no error in the distribution of the data; and
   receive, by a billing unit, when the off-chain pool management unit receives the request to create the off-chain pool from the data receiving node, (a) a predetermined cost from the data receiving node, (b) from the data receiving node, a reception completion message indicating that the reception of the data has been completed, and (c) from the data transmitting node, a transmission completion message indicating that the transmission of the data has been completed; and then paying a transmission cost to the one or more data transmitting nodes after receiving both the reception completion message and the transmission completion message.

2. The non-transitory computer readable storage medium for distributing data according to claim 1, wherein the transmission record is based on a transmission receipt that is issued to the data transmitting node as the data receiving node receives the data from the data transmitting node, and wherein the transmission receipt is executed with digital signature using a private key of the data receiving node.

3. The non-transitory computer readable storage medium for distributing data according to claim 1, wherein if it is verified at the data distribution verification unit that there is no error in the distribution of the data, the block chain storage unit further stores meta-information or transaction record of the data in the block chain, wherein the meta-information contains at least one of name of the data, maker of the data and production year of the data, and wherein the transaction record is distribution record of the data created based on the transmission record or the reception record.

4. A method for distributing data which manages the distribution of data from one or more data transmitting node to a data receiving node, comprising:
   an off-chain pool management step of transmitting an identification number of an off-chain pool to the data receiving node upon receiving a request to create the off-chain pool from the data receiving node, and paying a transmission cost to the one or more data transmitting nodes after receiving, from the data receiving node, a reception completion message indicating that the reception of the data has been completed, and a transmission completion message indicating that the transmission of the data has been completed;
   an integrity authentication step of, as for the data that the data receiving node receives from the data transmitting node through the off-chain pool or for the reception record that the data receiving node receives the data, authenticating the integrity of the data or authenticating the integrity of the reception record by deriving a Merkle Tree Root Hash Value using Merkle Tree;
   a data distribution verification unit step of receiving a transmission record upon transmitting the data from the one or more data transmitting nodes, and comparing the reception record with the transmission record to verify whether there is an error in the distribution of the data; and
   a block chain storage step of storing the Merkle Tree Root Hash Value in the block chain, if it is verified at the data distribution verification step that there is no error in the distribution of the data.

5. The method for distributing data according to claim 4, wherein the transmission record is based on a transmission receipt that is issued to the data transmitting node as the data receiving node receives the data from the data transmitting node, and wherein the transmission receipt is executed with digital signature using a private key of the data receiving node.

6. The method for distributing data according to claim 4, wherein if it is verified at the data distribution verification step that there is no error in the distribution of the data, the block chain storage step further comprises storing meta-information or transaction record of the data in the block chain, wherein the meta-information contains at least one of name of the data, maker of the data and production year of the data, and wherein the transaction record is distribution record of the data created based on the transmission record or the reception record.

* * * * *